(12) United States Patent
Simmons

(10) Patent No.: US 12,473,130 B2
(45) Date of Patent: Nov. 18, 2025

(54) SHEET PACKAGING

(71) Applicant: Gregory Simmons, Cheltenham (AU)

(72) Inventor: Gregory Simmons, Cheltenham (AU)

(*) Notice: Subject to any disclaimer, the term of this patent is extended or adjusted under 35 U.S.C. 154(b) by 162 days.

(21) Appl. No.: 18/253,151

(22) PCT Filed: Nov. 24, 2021

(86) PCT No.: PCT/AU2021/051407
§ 371 (c)(1),
(2) Date: May 16, 2023

(87) PCT Pub. No.: WO2022/109672
PCT Pub. Date: Jun. 2, 2022

(65) Prior Publication Data
US 2024/0002120 A1    Jan. 4, 2024

(30) Foreign Application Priority Data
Nov. 25, 2020 (AU) ................. 2020904355

(51) Int. Cl.
*B65D 65/40* (2006.01)
*B31D 5/00* (2017.01)
(Continued)

(52) U.S. Cl.
CPC ......... *B65D 65/403* (2013.01); *B31D 5/0069* (2013.01); *B32B 3/266* (2013.01);
(Continued)

(58) Field of Classification Search
CPC ......... B32B 3/28; B32B 29/08; B32B 29/005; B32B 2250/26; B32B 2317/127; B32B 2553/02; B32B 3/26; B32B 3/266; B31D 5/0069; B31D 2205/0058; B65D 65/466; B65D 65/403; B31F 1/2822;
(Continued)

(56) References Cited

U.S. PATENT DOCUMENTS 2,503,874 A    4/1950 Ives
2,642,372 A    6/1953 Yardley
(Continued)

FOREIGN PATENT DOCUMENTS

WO    2013184649 A1    12/2013

OTHER PUBLICATIONS

International Search Report & Written Opinion dated Feb. 24, 2022 from PCT Application No. PCT/AU2021/051407.

*Primary Examiner* — Catherine A. Simone
(74) *Attorney, Agent, or Firm* — INNOVATION CAPITAL LAW GROUP, LLP; Vic Lin

(57) ABSTRACT

Sheet packaging has a corrugated ply bonded to a backing ply. The corrugated ply forms parallel flutes. The packaging comprises voids through both the corrugated ply and the backing ply at intervals along the flutes, thereby forming a plurality of insular portions interconnected by flexures. Each insular portion has a flute portion and a backing portion between adjacent voids and bonded together at respective edges and each flexure comprises bonded-together portions of the corrugated ply and the backing ply. The flexures confer hyper flexibility to the packaging wherein each flexure possesses an independent bend axis across which the flexure can both be twisted and bent.

16 Claims, 11 Drawing Sheets

(51) Int. Cl.
　　　*B32B 3/26*　　　(2006.01)
　　　*B32B 3/28*　　　(2006.01)
　　　*B32B 7/12*　　　(2006.01)
　　　*B32B 29/00*　　(2006.01)
　　　*B32B 29/08*　　(2006.01)
　　　*B32B 37/12*　　(2006.01)
　　　*B65D 65/46*　　(2006.01)
　　　*B65D 81/03*　　(2006.01)

(52) U.S. Cl.
　　　CPC ................. *B32B 3/28* (2013.01); *B32B 7/12* (2013.01); *B32B 29/005* (2013.01); *B32B 29/08* (2013.01); *B32B 37/12* (2013.01); *B65D 65/466* (2013.01); *B65D 81/03* (2013.01); *B31D 2205/0017* (2013.01); *B31D 2205/0058* (2013.01); *B32B 2250/02* (2013.01); *B32B 2250/26* (2013.01); *B32B 2307/7163* (2013.01); *B32B 2317/127* (2013.01); *B32B 2553/02* (2013.01); *B65D 2565/385* (2013.01)

(58) Field of Classification Search
　　　CPC ..... Y10T 428/24298; Y10T 428/24306; Y10T 428/24314
　　　USPC .......................... 428/131–137, 178, 181–186
　　　See application file for complete search history.

(56) References Cited

U.S. PATENT DOCUMENTS

| | | |
|---|---|---|
| 5,439,730 A | 8/1995 | Kelly et al. |
| 5,750,235 A * | 5/1998 | Yoshimasa ............ B31F 1/0012 428/184 |
| 2015/0051895 A1 | 2/2015 | Canedo |
| 2019/0100369 A1 | 4/2019 | Hoffman et al. |

* cited by examiner

SHEET PACKAGING

FIELD OF THE INVENTION

This invention relates generally to sheet packaging and, more particularly, this invention relates to a hyperflexible configuration of sheet packaging.

BACKGROUND OF THE INVENTION

Cushioning sheet material is used for packaging and include a variety of configurations, including plastic bubble wrap.

Recyclable cardboard-based packaging alternatives to plastic bubble wrap is desirous however and, in this regard, U.S. Pat. No. 2,503,874 A (Ives) 11 Apr. 1950 proposes a planar reinforced layer having a corrugated layer bonded thereto. Ives teaches rows of straight notches being cut through the cardboard layer to confer flexibility across flutes of the cardboard layer.

The present invention seeks to provide sheet packaging, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein sheet packaging comprising a corrugated ply bonded to a backing ply. The corrugated ply forms parallel flutes.

The packaging comprises voids through both the corrugated ply and the backing ply at intervals along the flutes.

The present voids formed through the corrugated ply and the backing ply at intervals along the flutes form a plurality of insular portions interconnected by flexures. Each insular portion comprising a flute portion and a backing portion between adjacent voids and bonded together at respective edges, and each flexure comprises bonded-together portions of the corrugated ply and the backing ply.

These flexures confer hyper flexibility to the packaging wherein each flexure possesses an independent bend axis across which the flexure can both be twisted and bent. Furthermore, the flexures allow distortion of the packaging without compromising the cushioning structural integrity of the insular portions.

Unlike the arrangement of Ives for example which can only be bent along the flutes, across the flutes along the rows of voids or diagonally across diagonal voids, the present packaging can be twisted and bent across into arbitrary shapes and forms including across nonorthogonal and nondiagonal axes as is illustrated in FIGS. 7 and 8 and 9 and 10 for example.

The stiffness and flexibility of the present packaging may be controlled by the extent to which edges of insular portions of adjacent flutes overlap.

There are further provided embodiments herein wherein the sizing and respective positioning of the voids and insular portions can be adjusted to control the stiffness and other performance properties of the present packaging.

The corrugated ply and the backing ply preferably comprises cardboard and may be made in the manufacturing process wherein the corrugated ply is bonded to the backing ply whereafter the voids are punched, cut or formed through both simultaneously.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
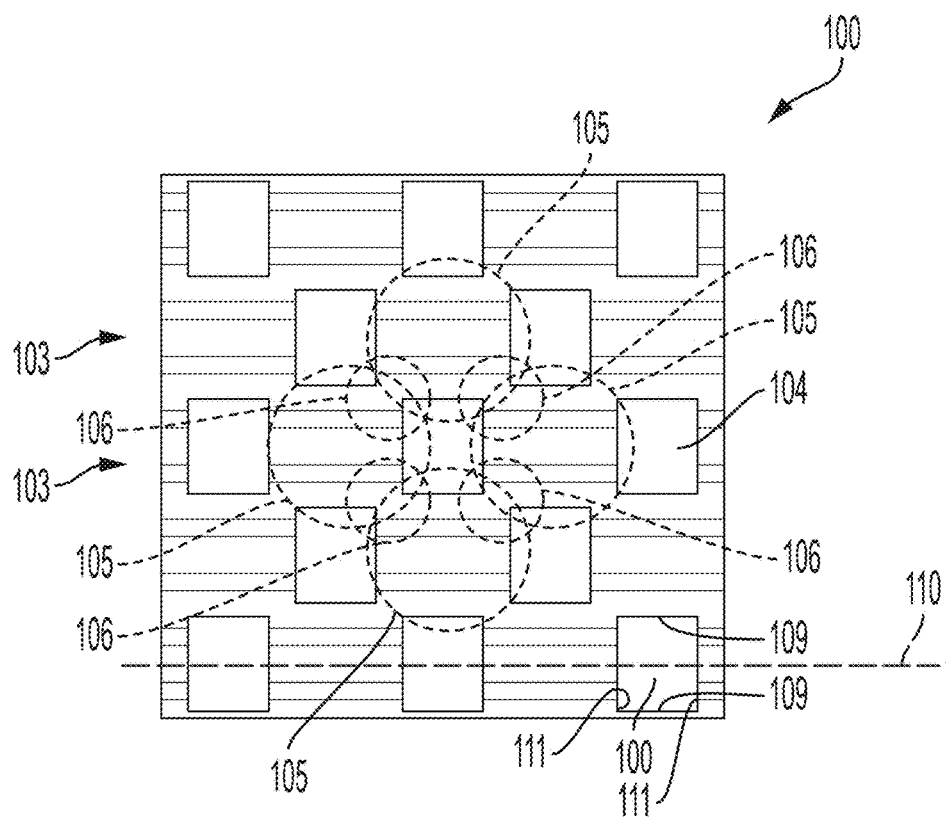
FIG. 1 shows a top plan view of sheet packaging in accordance with an embodiment.
Figure 2:
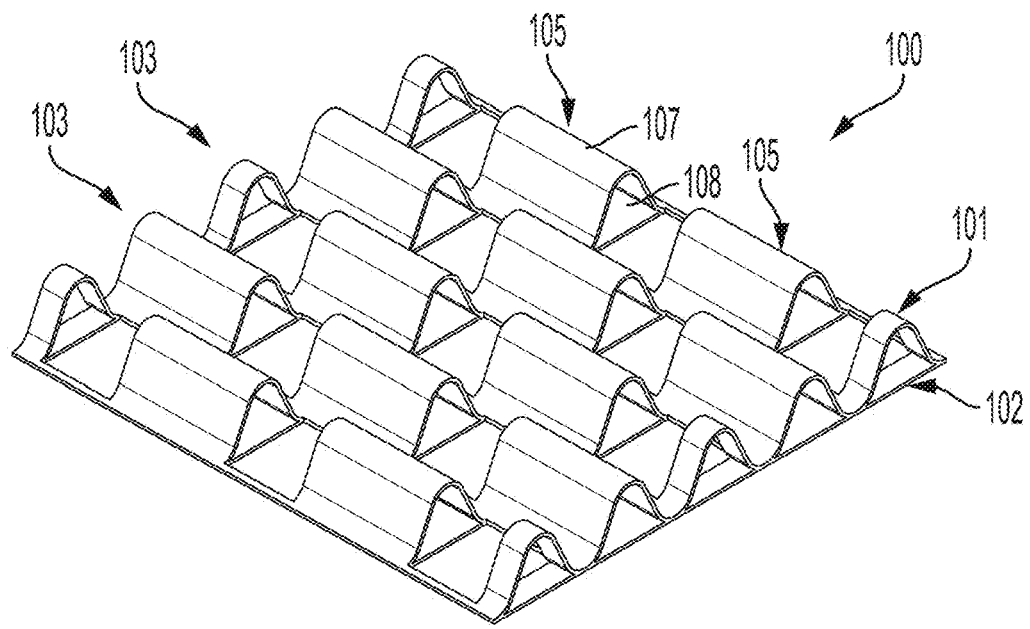
FIG. 2 shows a perspective view of the packaging of FIG. 1.

FIGS. 1 and 2 shows packaging 100 comprising a corrugated ply 101 adhered to a backing ply 102. The corrugated ply 101 and the backing ply 102 are preferably cardboard.

Furthermore, the packaging 100 preferably comprises biodegradable and/or compostable material.

The corrugated ply 101 forms parallel flutes 103. The corrugated ply 101 forms a generally wavelike pattern and may be generally sinusoidal and bonded to the backing ply 102 using adhesive or the like along apexes of an undersurface of the corrugated ply 101. Other corrugated ply 101 shapes are envisaged, including the corrugated ply 101 being flat topped trapezoidal in cross sectional shape.

The packaging 100 comprises voids 104 through both the corrugated ply 101 and the backing ply 102 at intervals along the flutes 103, thereby forming a plurality of insular portions 105 interconnected by flexures 106 generally shown in FIG. 1.

With reference to FIG. 2, each insular portion 105 comprises a flute portion 107 and a backing portion 108 bonded at respective edges along the respective flute 103.

Furthermore, each flexure 106 comprises bonded together portions of the corrugated ply 101 and the backing ply 102.

Figure 3:
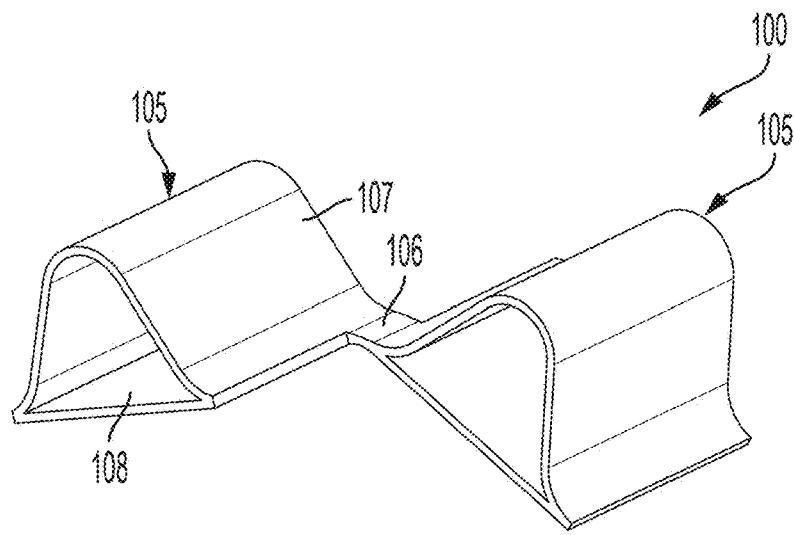
FIG. 3 illustrates bending of a flexure between insular portions of the packaging.
Figure 4:
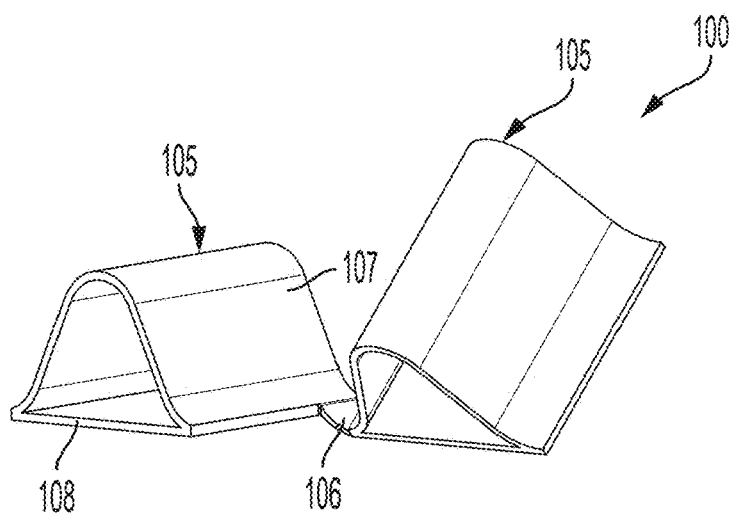
FIG. 4 illustrates twisting of a flexure between insular portions of the packaging.
Figure 5:
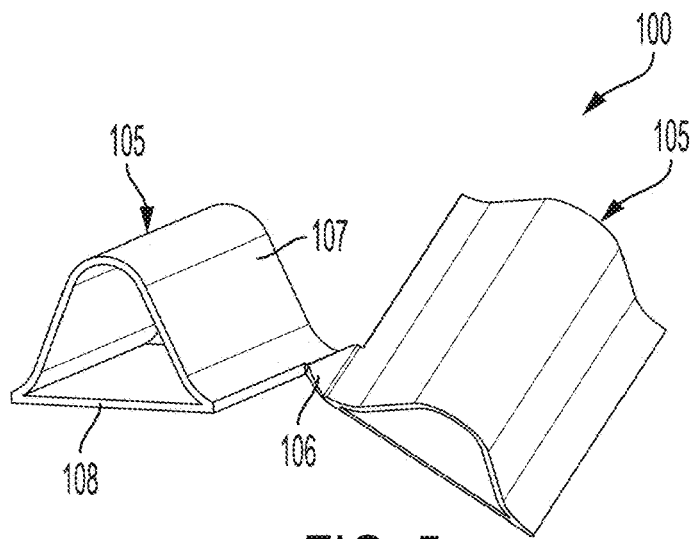
FIG. 5 illustrates both bending and twisting between insular portions of the packaging.

FIG. 3 shows a flexure 106 bending between adjacent insular portions 105, FIG. 4 shows a flexure 106 twisting between insular portions 105 and FIG. 5 shows a flexure 106 both bending and twisting between insular portions 105.

Figure 6:
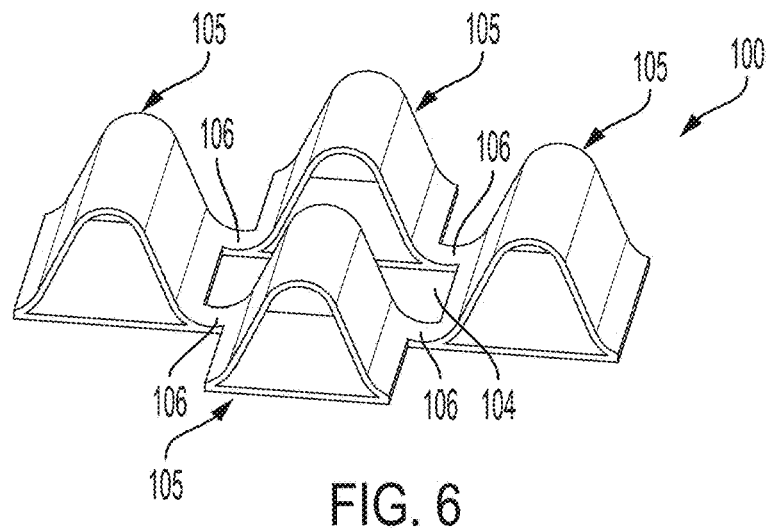
FIG. 6 illustrates a quadrant of insular portions interconnected by respective flexures around a void when laid flat.
Figure 7:
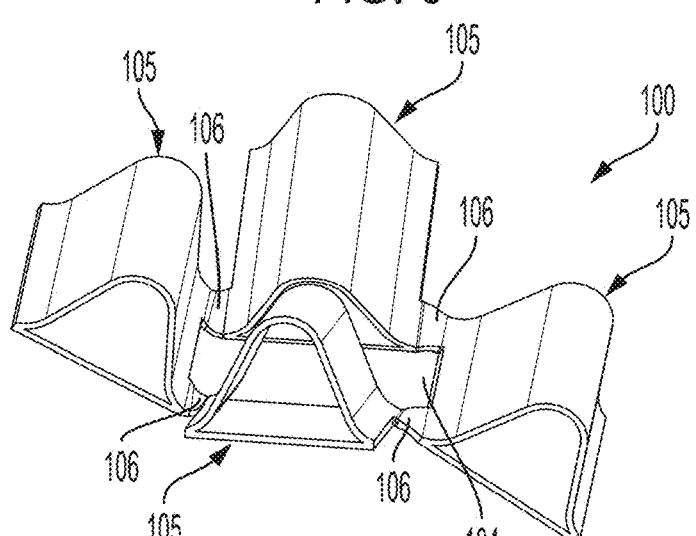
FIG. 7 shows the embodiment of FIG. 6 when the packaging is twisted and bent.

FIG. 6 shows a quadrant of insular portions 105 interconnected around a void 104 by respective flexures 106 when the packaging 100 is laid flat and FIG. 7 shows the packaging of FIG. 6 being twisted and bent, illustrating the hyper flexibility conferred by each flexure 106 having an independent bend axis.

Figure 8:
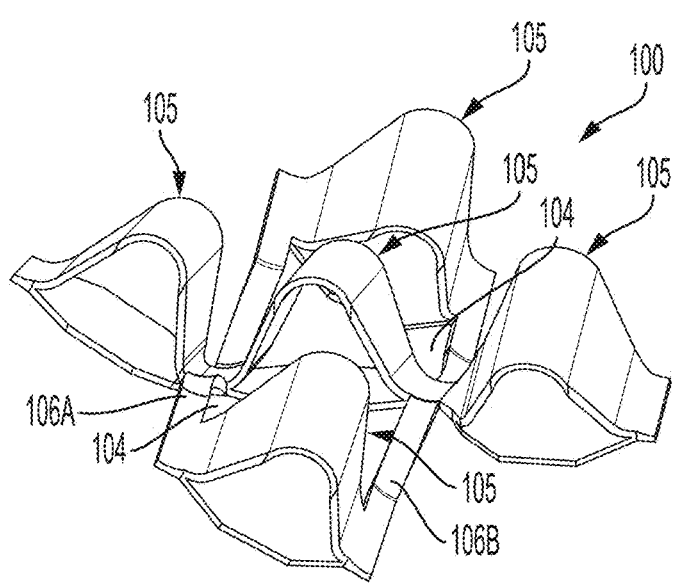
FIG. 8 shows a further embodiment of the packaging illustrating the way in which the packaging can be arbitrarily twisted and bent.

FIG. 8 further illustrates how an elongate flexure 106A can itself bend under compression whilst in opposing flexure 106B can be under tension allowing the packaging 100 to be twisted and bent.

Figure 9:
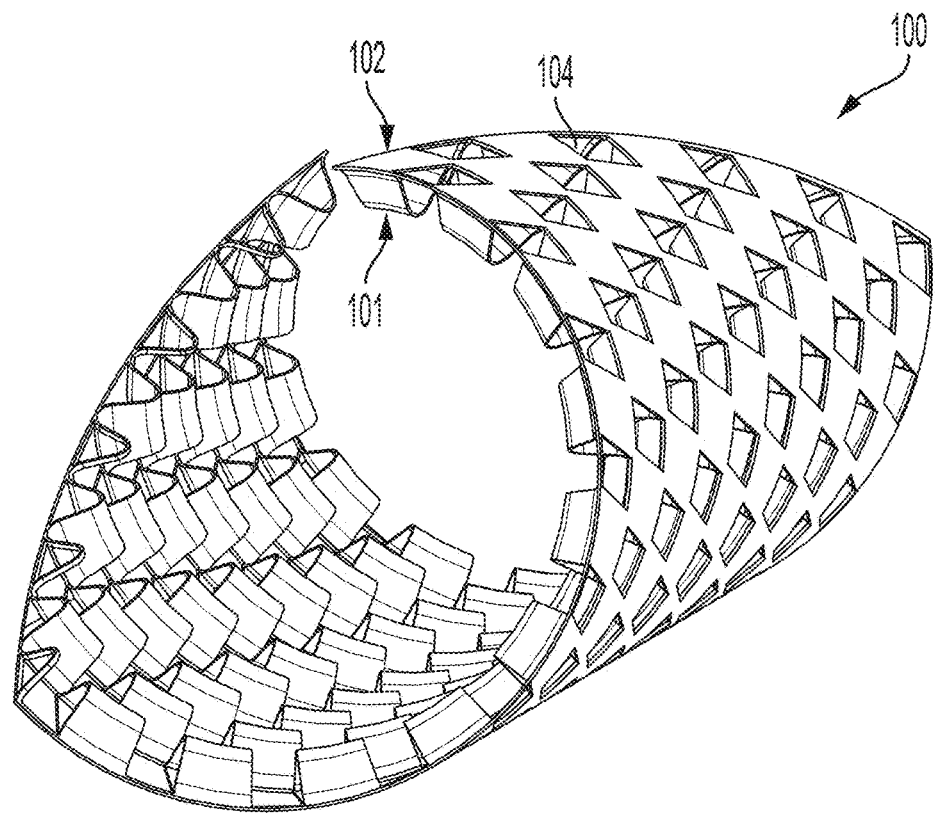
FIG. 9 shows packaging in accordance with an embodiment bent against the corrugated ply.
Figure 10:
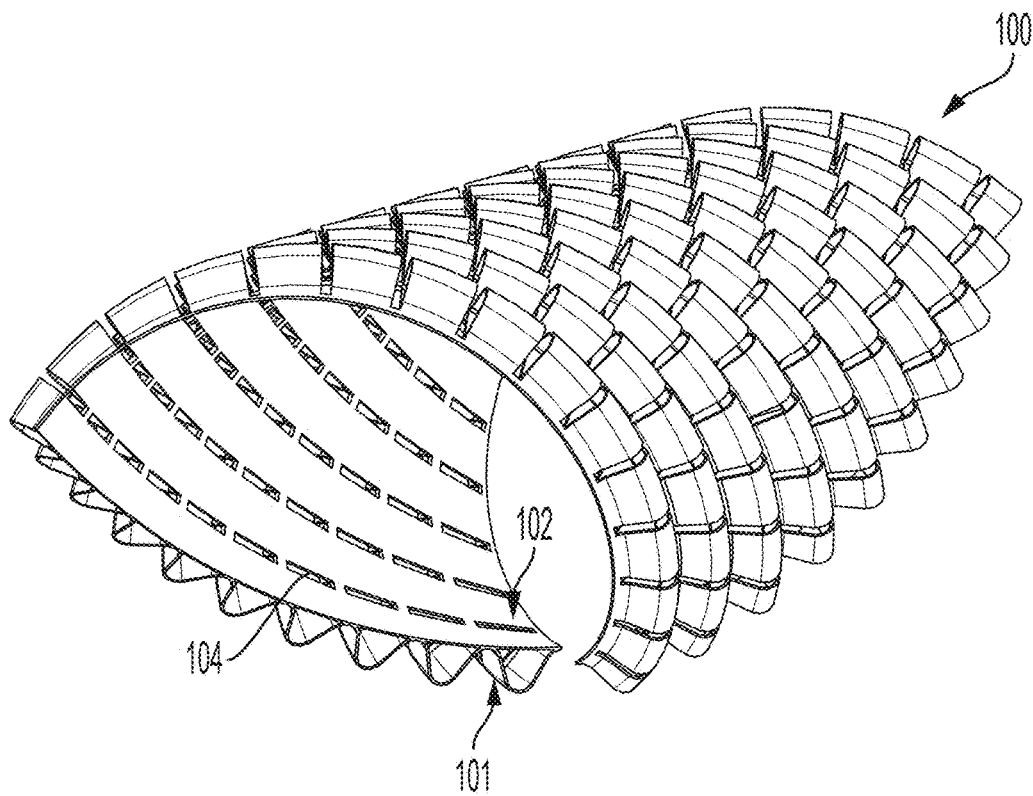
FIG. 10 illustrates packaging in accordance with an embodiment bent against the backing ply.

FIG. 9 illustrates the packaging 100 in accordance with an embodiment hyper flexibly folded against the corrugated ply 101 whereas FIG. 10 illustrates the packaging 100 in accordance with a further embodiment hyper flexibly folded against the backing ply 102.

According to the embodiment of FIG. 1, the voids 104 may be generally rectangular wherein each void 104 comprises straight edges 109 aligned along flute axes 110 and straight edges 111 orthogonally with respect to the flute axes 110.

Figure 21:
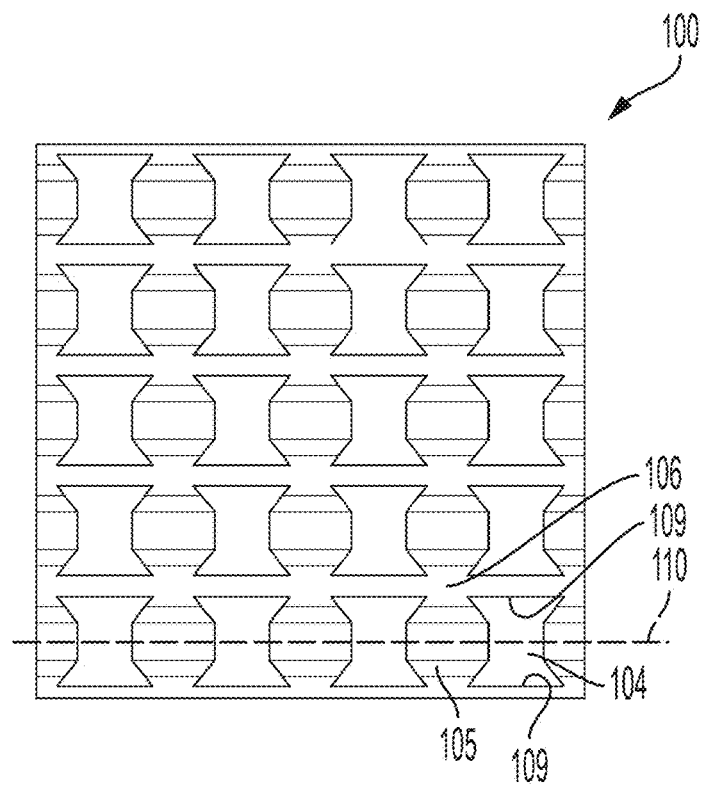
FIG. 21 shows a top plan view of the packaging in accordance with a further embodiment.
Figure 22:
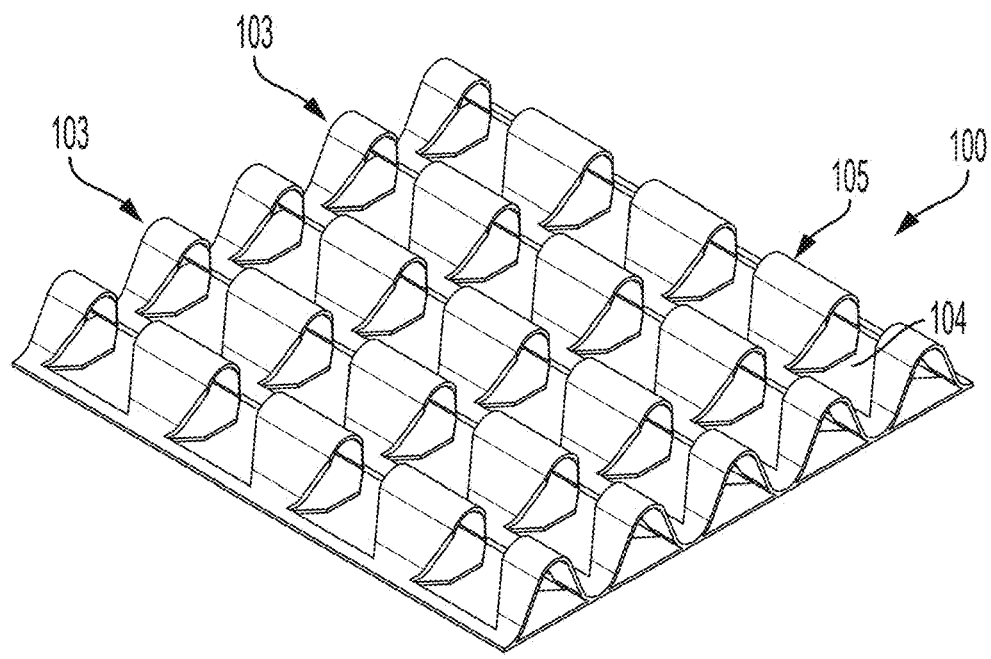
FIG. 22 shows a perspective view of the packaging of FIG. 21.

FIGS. 21 and 22 show wherein the voids 104 are non-rectangular. In accordance with the embodiment shown, each void 104 may yet comprise straight edges 109 along the flute axis 110 but wherein the voids 104 widen at opposite edges thereof along the flute axis 110 to increase the effective central cushioning width of the insular portion 105 along the flute axis 110 yet decrease the width of the flexures 106 along the flute axis 110 for increased flexibility. In this way, the horizontal cross section of the shapes of the voids 104 and/or the insular portions 105 may be adjusted to control the flexibility and/or the cushioning of the packaging 100.

In accordance with the embodiment shown in FIG. 1, the voids 104 of adjacent flutes 103 are alternately aligned along flute axes 110 so that each insular portion 105 is diagonally interconnected to a quadrant of adjacent insular portions 105.

According to the embodiment of FIG. 1, the insular portions 105 of adjacent flutes 103 overlap along flute axes 110 thereby increasing stiffness along flute axes 110. Furthermore, according to the embodiment of FIG. 1, the voids 104 of adjacent flutes 103 do not overlap across the flute axes 110, reducing stiffness across the flute axes 110.

Figure 11:
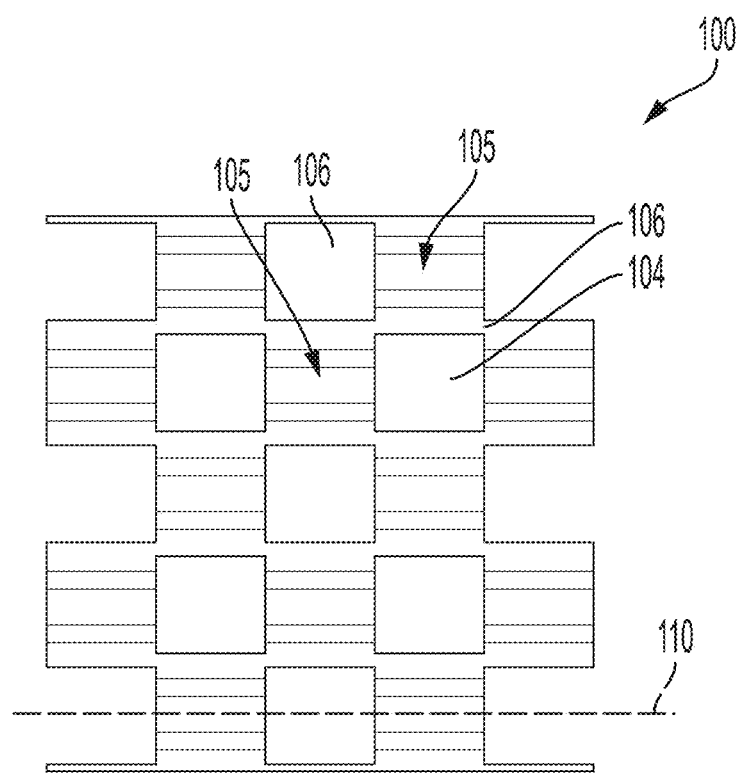
FIG. 11 shows a top plan view of the packaging in accordance with a further embodiment.
Figure 12:
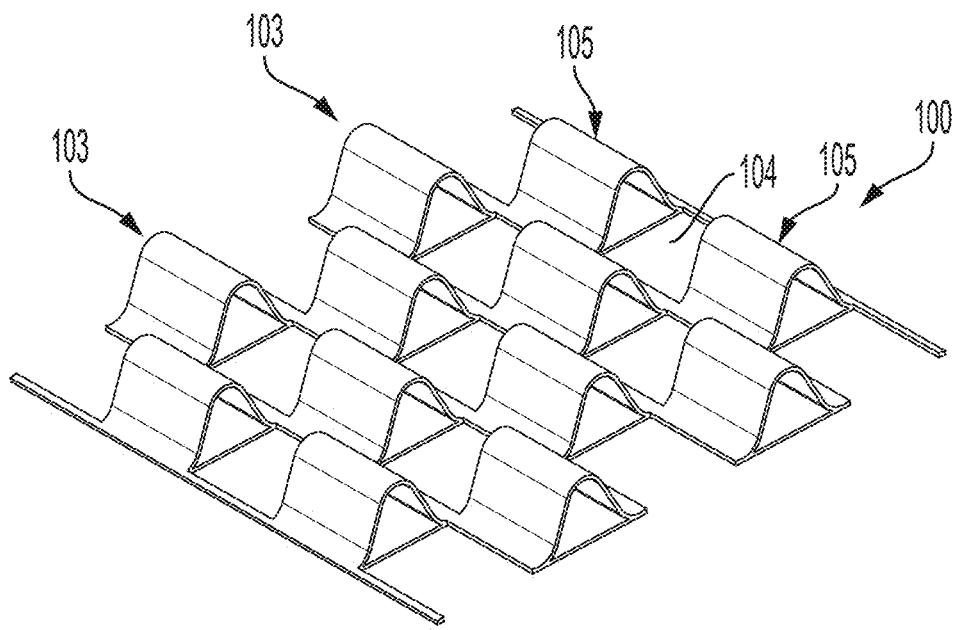
FIG. 12 shows a perspective view of the packaging of FIG. 11.

According to the embodiment of FIGS. 11 and 12, edges of insular portions 105 of adjacent flutes 103 are aligned along flute axes 110, thereby reducing stiffness along the flute axes 110 and forming discrete fold lines across the flute axes 110 as compared to the embodiment of FIGS. 1 and 2.

Figure 13:
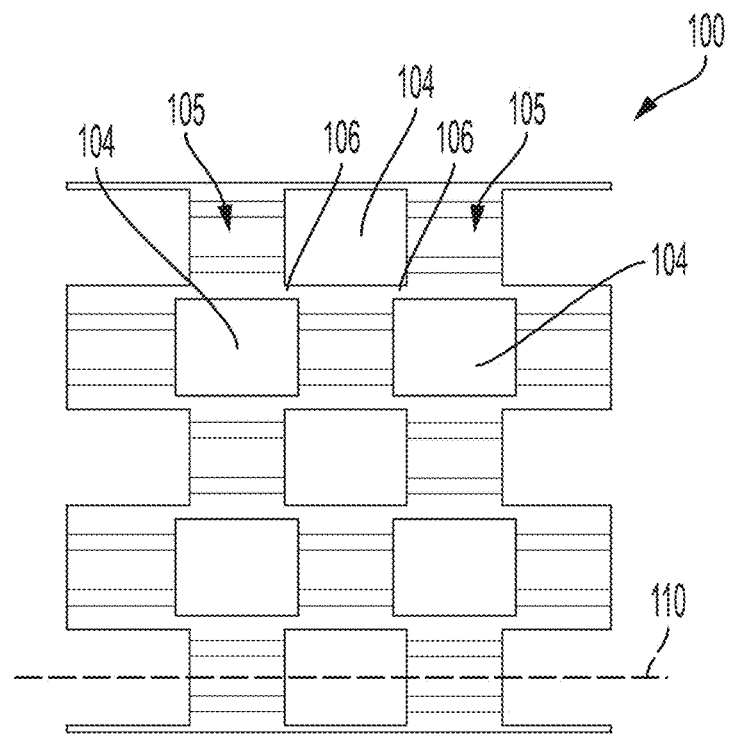
FIG. 13 shows a top plan view of the packaging in accordance with a further embodiment.
Figure 14:
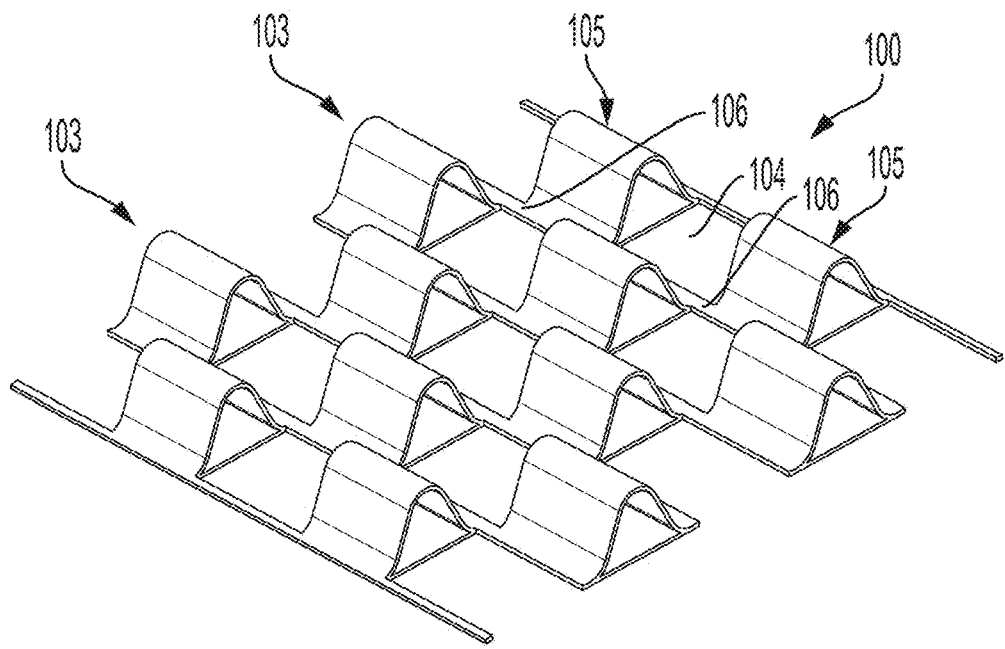
FIG. 14 shows a perspective view of the packaging of FIG. 13.

According to the embodiment of FIG. 13, the voids 104 are wider as compared to the insular portions 105 along flute axes thereby increasing flexibility.

Furthermore, voids 104 of adjacent flutes 103 overlap along flute axes 110, thereby forming flexures 106 which have longitude along flute axes 110, thereby increasing flexibility thereof.

Figure 15:
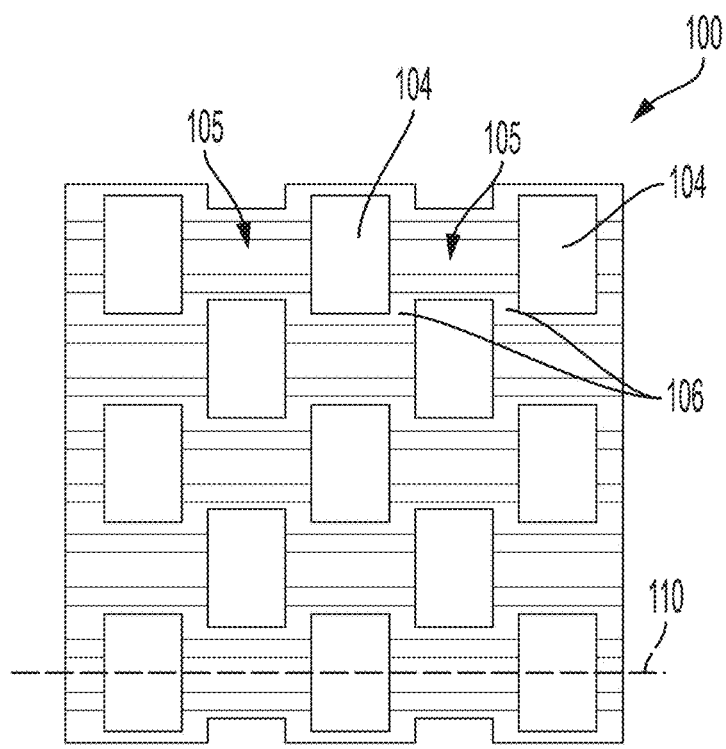
FIG. 15 shows a top plan view of the packaging in accordance with a further embodiment.
Figure 16:
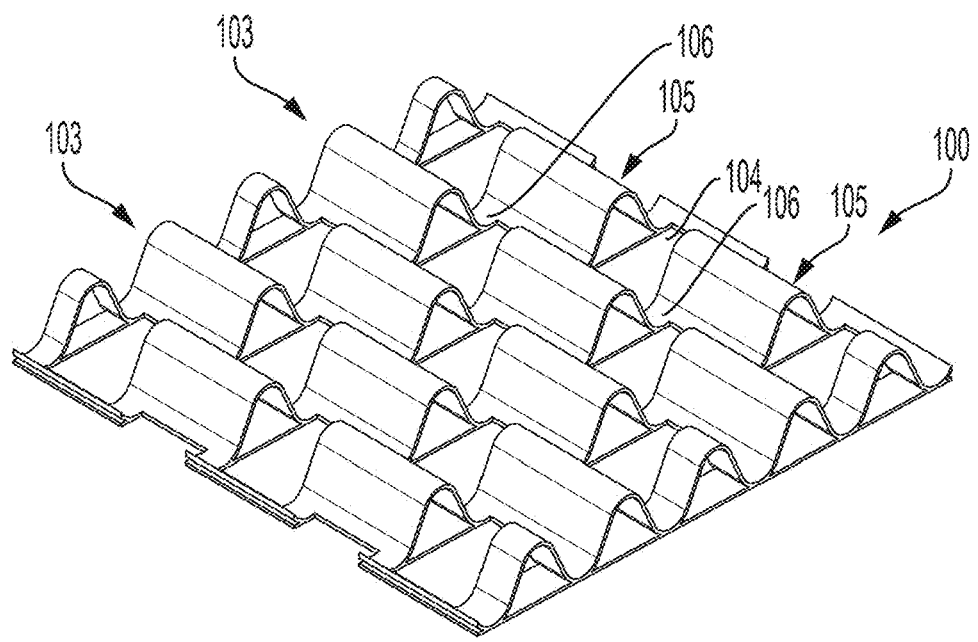
FIG. 16 shows a perspective view of the packaging of FIG. 15.

FIG. 15 shows an embodiment wherein the voids 104 are narrower than the insular portions 105 along flute axes 110, thereby increasing stiffness along the flute axes 110. This is compared to the embodiment of FIG. 13 which shows the voids 104 being wider than the insular portions 105 along the flute axis 110, thereby reducing stiffness along the flute axes 110.

Furthermore, FIG. 15 shows wherein edges of the voids 104 along flute axes 110 of adjacent flutes 104 overlap, thereby conferring flexure 106 longitude across flute axes 110 have an increased flexibility across flute axes 110.

Figure 17:
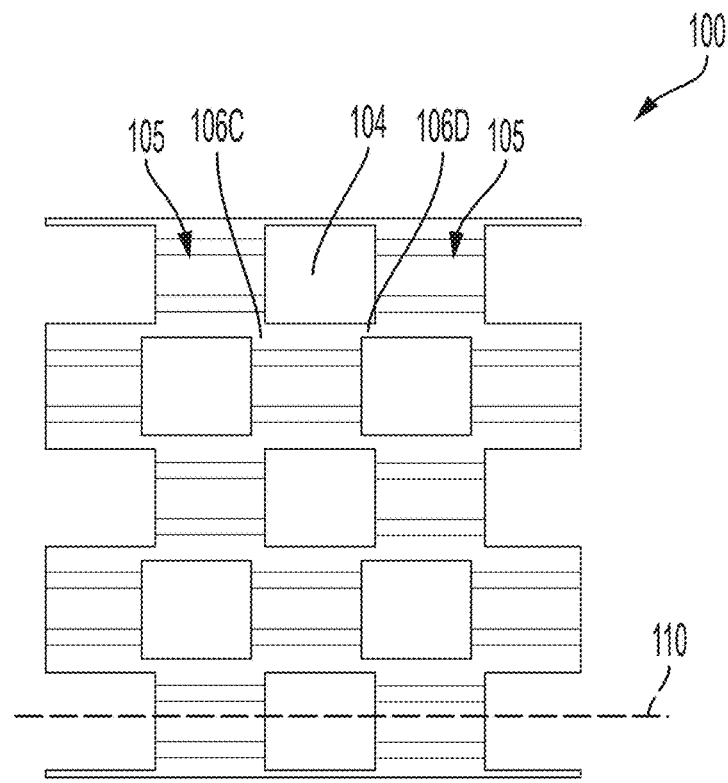
FIG. 17 shows a top plan view of the packaging in accordance with a further embodiment.
Figure 18:
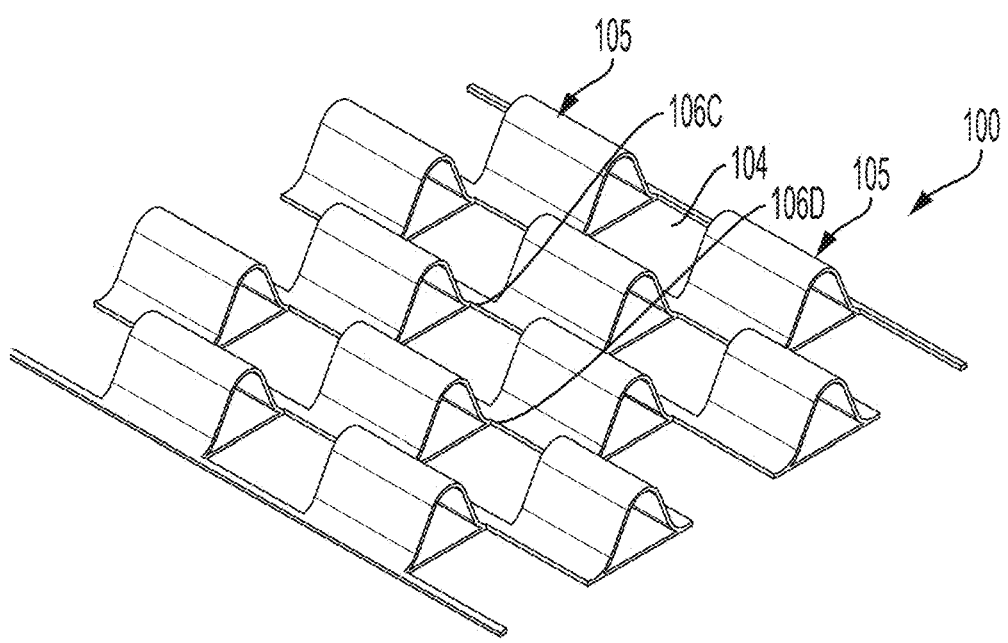
FIG. 18 shows a perspective view of the packaging of FIG. 17.

FIG. 17 shows an embodiment wherein the voids 104 of parallel flutes 103 are alternately arranged overlapping and nonoverlapping along flute axes 110 thereby creating a pattern of shorter flexures 106C and longer flexures 106D along flute axes 110 thereby conferring nonuniform flexing properties to the packaging 100 along flute axes 110.

Figure 19:
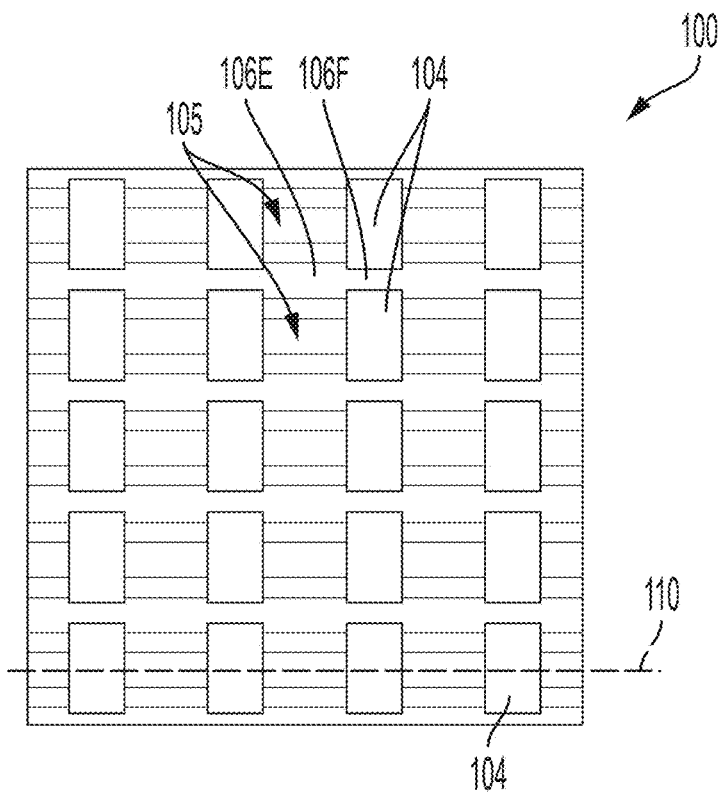
FIG. 19 shows a top plan view of the packaging in accordance with a further embodiment.
Figure 20:
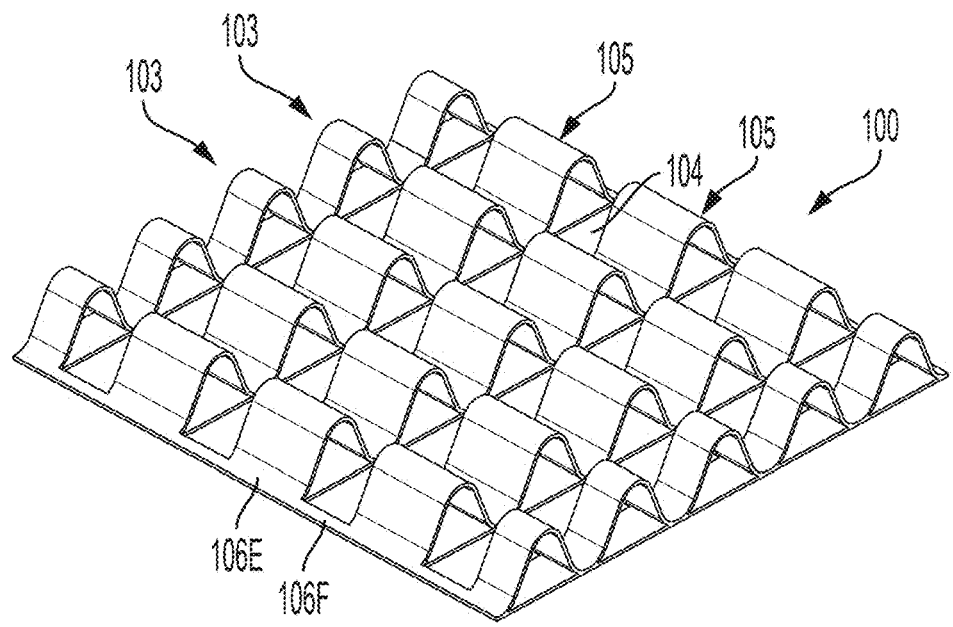
FIG. 20 shows a perspective view of the packaging of FIG. 19.

According to the embodiment of FIG. 19, the voids 104 are aligned across the flute axes 110 so that flexures 106E are formed between adjacent insular portions 105 and flexures 106F are formed between adjacent voids 104.

Figure 23:
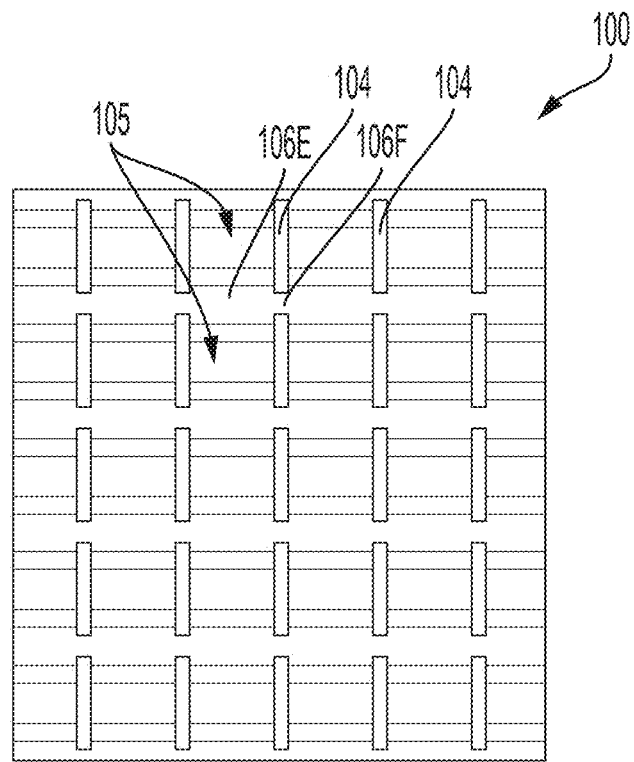
FIG. 23 shows a top plan view of the packaging in accordance with a further embodiment.
Figure 24:
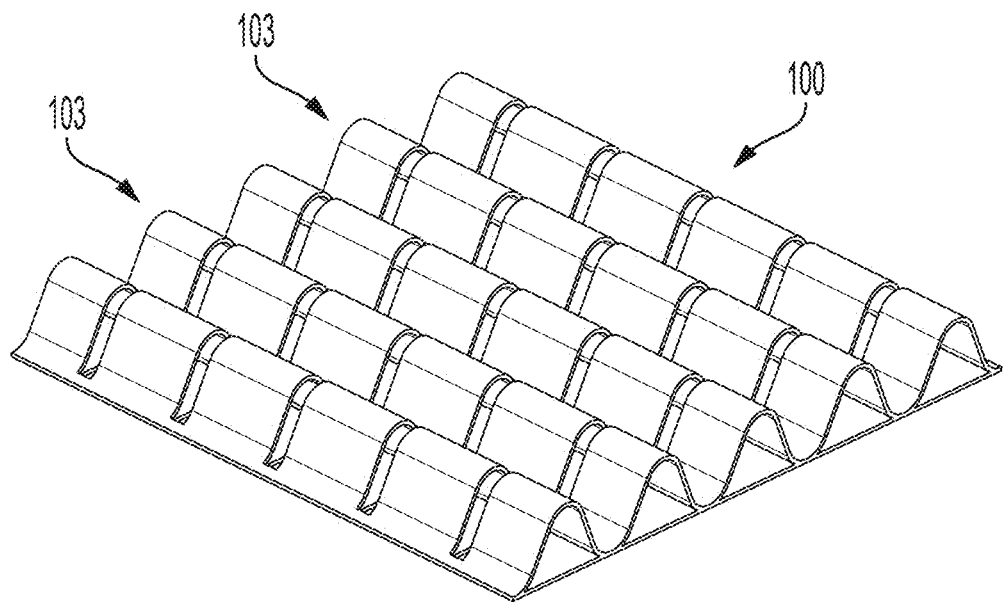
FIG. 24 shows a perspective view of the packaging of FIG. 23.

FIGS. 23 and 24 show a similar embodiment but wherein the voids 104 are much narrower.

Manufacture of the packaging 100 may comprise adhering the corrugated ply 101 to the backing ply 102 and subsequently punching, forming or cutting the voids 104 through both layers.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. Sheet packaging comprising a corrugated ply bonded to a backing ply, the corrugated ply forming parallel flutes extending in rows along a first direction, and wherein the packaging comprises voids through both the corrugated ply and the backing ply, aligned along and within the rows, at intervals along the rows of flutes, thereby forming through holes through the sheet packaging within each of the rows of flutes, and thereby forming a plurality of insular portions interconnected by flexures, each insular portion comprising a flute portion and a backing portion between adjacent voids and bonded together at respective edges, and each flexure comprises bonded-together portions of the corrugated ply and the backing ply, wherein the voids formed along one row of the flutes are offset from voids formed along an adjacent row of the flutes.

2. The packaging as claimed in claim 1, wherein each insular portion is connected diagonally to a quadrant of adjacent insular portions.

3. The packaging as claimed in claim 1, wherein each void comprises straight edges aligned along flute axes.

4. The packaging as claimed in claim 1, wherein each void comprises straight edges aligned orthogonally with respect to flute axes.

5. The packaging as claimed in claim 1, wherein the voids widen at opposite edges thereof along flute axes.

6. The packaging as claimed in claim 1, wherein central portions of the insular portions widen along flute axes.

7. The packaging as claimed in claim 1, wherein voids of adjacent flutes are alternately aligned along flute axes.

8. The packaging as claimed in claim 7, wherein insular portions of adjacent flutes overlap along flute axes.

9. The packaging as claimed in claim 7, wherein voids of adjacent flutes do not overlap across flute axes.

10. The packaging as claimed in claim 7, wherein edges of insular portions of adjacent flutes are aligned along flute axes.

11. The packaging as claimed in claim 7, wherein the voids are wider as compared to the insular portions along flute axes.

12. The packaging as claimed in claim 7, wherein the voids are narrower as compared to the insular portions along flute axes.

13. The packaging as claimed in claim 7, wherein edges of the voids along flute axes of adjacent flutes overlap across flute axes.

14. The packaging as claimed in claim 7, wherein the voids of parallel flutes are alternately arranged overlapping and nonoverlapping along flute axes.

15. The packaging as claimed in claim 7, wherein the voids are orthogonally aligned across flute axes.

16. Manufacture of the packaging as claimed in claim 1, comprising adhering the corrugated ply to the backing ply and subsequently forming the voids through both the corrugated ply and the backing ply simultaneously.

\* \* \* \* \*